United States Patent
Victor et al.

(10) Patent No.: US 12,406,273 B1
(45) Date of Patent: Sep. 2, 2025

(54) LEVERAGING CLUSTERING MODELS TO REDUCE BIAS

(71) Applicant: MASTERCARD INTERNATIONAL INCORPORATED, Purchase, NY (US)

(72) Inventors: William Victor, Arlington, VA (US); Steven Silverman, Arlington, VA (US); Robert Albright, Washington, DC (US); S. Jordan Berman, Washington, DC (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 744 days.

(21) Appl. No.: 16/782,987

(22) Filed: Feb. 5, 2020

(51) Int. Cl.
  *G06Q 30/02* (2023.01)
  *G06F 18/22* (2023.01)
  *G06F 18/23213* (2023.01)
  *G06Q 30/0201* (2023.01)

(52) U.S. Cl.
  CPC ......... *G06Q 30/0201* (2013.01); *G06F 18/22* (2023.01); *G06F 18/23213* (2023.01)

(58) Field of Classification Search
  CPC . G06Q 30/0201; G06K 9/6215; G06K 9/6223
  See application file for complete search history.

(56) References Cited

U.S. PATENT DOCUMENTS

| | | | |
|---|---|---|---|
| 2013/0024274 A1* | 1/2013 | Villars | G06Q 10/00 705/14.45 |
| 2017/0353827 A1* | 12/2017 | D'Alberto | G06Q 30/0267 |
| 2021/0192548 A1* | 6/2021 | Wang | G06F 18/23213 |
| 2021/0224856 A1* | 7/2021 | Lu | G06Q 30/0246 |

OTHER PUBLICATIONS

"Market Response Models—Predicting incremental gains of promotional campaigns" (Karaman, Baris; published on Jul. 28, 2019 at https://towardsdatascience.com/market-response-models-baf9f9913298 ) (Year: 2019).*

* cited by examiner

*Primary Examiner* — James M Detweiler
(74) *Attorney, Agent, or Firm* — Foley & Lardner LLP

(57) ABSTRACT

Disclosed herein are systems and methods that use test and control datasets to evaluate effectiveness of an event. An analytic server may retrieve a set of nodes comprising a subset of nodes corresponding to the test customers and a subset of nodes corresponding to the control customers. The analytic server may use a clustering method to generate a number of clusters for the set of nodes based on a set of attributes prior to the event. The nodes within each cluster have a set of matching attributes. The analytic server may calculate a weight factor for each cluster corresponding to a proportion of the test customers. The analytic server may compare the performance difference between the test customers and control customers within each cluster. Based on the performance difference within each cluster and the weight factor for each cluster, the analytic server may determine the effectiveness of the event.

15 Claims, 8 Drawing Sheets

FIG. 4

LEVERAGING CLUSTERING MODELS TO REDUCE BIAS

TECHNICAL FIELD

This application relates generally to leveraging clustering models to reduce bias.

BACKGROUND

Merchants often execute a number of events (e.g., campaigns) to help increase sales volume and customer loyalty. When employing conventional tools and systems to measure the effectiveness of a campaign, a merchant may send promotional materials to a subset of its customers (test group) who are identified as targets of the promotion and compare the performance (e.g., sales) of that subset to a sample of comparable customers who are not part of the promotion (control group). The effectiveness of the campaign may be based on the comparison between performance of the test group and the control group.

In order to accurately measure the effectiveness of a tested event (e.g., a sales campaign), the test group users and the control group users should have similar attributes. When the test group users and control group users are similar, the performance difference between the two groups originates mainly from the tested event not from attribute differences. When the test group users and control group users are not similar, the comparison between the performance of the test group and the performance of the control group may not reflect the effectiveness of the campaign. For example, the test group may include more high-spending customers than the control group by random chance. The performance difference may originate from the spending habit. As a result, the measurement of the effectiveness of the event may be biased.

Conventional and existing software solutions have been unable to efficiently and accurately solve the above-mentioned problem. Conventional methods may use a bucketing mechanism to reduce the bias. Specifically, conventional bucketing methods may compare test customers and control customers along each matching attribute independently. More specifically, conventional bucketing methods may divide the whole population of test group and control group into many subgroups (e.g., buckets) based on each attribute and compare the performance difference within each bucket. Control customers and test customers within each bucket may match in terms of one or more attributes. This process of bucketing the test group and control group may cause the problem of over bucketing, where the test group and control group are divided into too many subgroups/buckets based on the set of attributes. The number of buckets may exponentially increase with the number of attributes. As a result, test group and control group are divided into too many buckets, with each bucket containing too few customers where each bucket is heavily weighted. The small number of customers in each bucket may be sensitive to noise or amplify noise in the data.

FIG. 1A illustrates an example 100A of conventional bucketing a set of customers, according to an embodiment. In this example, the bucketing method may divide the whole population of test group and control group based on two attributes: customer prior spend and customer age. The customer prior spend may represent the amount of money spent in a certain period prior to the tested event. The bucketing method may divide the test group and control group into many buckets based on different ranges of the two attributes. The test customers and control customers falling within the same range of the two attributes are grouped into the same bucket. In this example, the test customers and control customers are grouped into 16 buckets, with each bucket containing a few customers. For example, bucket 4 101 may include only two customers. The small number of customers within each bucket may be sensitive to noise and amplify noise, which will inevitably lead to inaccurate results.

Furthermore, by dividing the test group and control group based on different ranges of attributes, conventional bucketing methods may fail to capture the semantics of the customer data. FIG. 1B illustrates an example 100B of a bucketing method using one attribute, according to an embodiment. In this example, the conventional bucketing method may divide the eight customers into four buckets based on four ranges of the attribute. Customers 102 and 104 are in bucket 1 corresponding to a first range. Customer 106 and 108 are in bucket 2 corresponding to a second range. However, even though customer 106 falls into a different range from customers 102 and 104, customer 106 is more similar to customers 102 and 104 than customer 108. Based on the semantics of the customer data, customer 106 should be grouped within the same bucket as customers 102 and 104, instead of customer 108. This example shows that the conventional bucketing methods may be unable to accurately group customers with similar attributes.

Some other conventional software solutions use clustering methods to achieve the same results. However, these conventional methods also suffer from technical shortcomings. For example, some conventional software solutions require end users to identify attributes for clustering data points, such as a total number of clusters, and the like. Therefore, these conventional software solutions shift (at least partially) the burden onto the end user, which is highly undesirable and produces inconsistent results.

SUMMARY

For the aforementioned reasons, what is needed is a computer-based solution that can accurately divide the whole population of test group and control group into subgroups, with each subgroup including test customers and control customers with matching attributes. It is desired to have a matching mechanism while dividing the test group and control group such that the measurement of the impact of the tested event can be more accurate with less or no bias. It is also desired to have a solution that is efficient, timely, and not reliant upon human intervention.

Disclosed herein are systems and methods capable of addressing the above-described shortcomings and may also provide any number of additional or alternative benefits and advantages. For example, the embodiments described herein may use a clustering method to divide the test group and control group into subgroups/clusters with matching attributes. More specifically, an analytic server may receive a set of nodes comprising a subset of nodes corresponding to the test customers and a subset of nodes corresponding to the control customers. The analytic server may execute a clustering computer model to generate a number of clusters for the set of nodes based on a set of attributes prior to the tested event. The nodes within each cluster have a set of matching attributes. The analytic server may calculate a weight factor for each cluster corresponding to a proportion of the test customers. The analytic server may compare the performance difference between the test customers and control customers within each cluster. Based on the performance difference within each cluster and the weight factor for each cluster, the analytic server may determine the effectiveness of the tested event.

Because the clustering computer model may generate a number of clusters comprising matching customers based on semantics of customer attributes, the clustering computer model may make sure that the matching of customers within each cluster is more accurate. As a result, the comparison of the performance between the test customers and control customers within each cluster may reflect the impact of the tested event more accurately with less or no bias.

The analytic server may divide a large set of nodes into clusters based on various attributes. For example, the set of nodes may comprise millions of customers, and the set of attributes may comprise 20 to 50 attributes. Manual processing of clustering such large datasets may be impractical, error-prone, and time-consuming. The systems and methods described herein allow the cluster computer model to generate a number of clusters based on the attributes using an automated and faster method. In this way, the methods described herein may create efficiencies that allow performing large work such as heavy calculations and time-consuming analysis in a more efficient manner than other approaches such as manual work performed by humans.

In one embodiment, a method comprises receiving, by a server from an electronic device, a request to determine an effectiveness of an event; retrieving, by the server, a set of nodes comprising a first subset of nodes where each node within the first subset of nodes is associated with the event and a second subset of nodes where each node within the second subset of nodes is not associated with the event; executing, by the server, a clustering computer model to generate a number of clusters for the set of nodes where each cluster comprises at least one node within the set of nodes by: calculating a multidimensional distance value between each node within the set of nodes, each dimension within the multidimensional distance corresponding to an attribute of each node within the set of nodes prior to the event, and iteratively calculating the multidimensional distance value and assigning each node to a cluster until multidimensional distance values of nodes within each cluster satisfy a distance threshold; calculating, by the server, a weight factor for each cluster, the weight factor for each cluster corresponding to a number of nodes associated with the first subset of nodes within each cluster; and executing, by the server, a test and control model to determine the effectiveness of the event by comparing a performance value associated with nodes within each cluster based on the weight factor for each cluster.

In another embodiment, a computer system comprises an electronic device, a server in communication with the electronic device and configured to: receive, from the electronic device, a request to determine an effectiveness of an event; retrieve a set of nodes comprising a first subset of nodes where each node within the first subset of nodes is associated with the event and a second subset of nodes where each node within the second subset of nodes is not associated with the event; execute a clustering computer model to generate a number of clusters for the set of nodes where each cluster comprises at least one node within the set of nodes by: calculating a multidimensional distance value between each node within the set of nodes, each dimension within the multidimensional distance corresponding to an attribute of each node within the set of nodes prior to the event, and iteratively calculating the multidimensional distance value and assigning each node to a cluster until multidimensional distance values of nodes within each cluster satisfy a distance threshold; calculate a weight factor for each cluster, the weight factor for each cluster corresponding to a number of nodes associated with the first subset of nodes within each cluster; and execute a test and control model to determine the effectiveness of the event by comparing a performance value associated with nodes within each cluster based on the weight factor for each cluster.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

FIG. 4 illustrates a graphical user interface of executing a clustering computer model, according to an embodiment.

DETAILED DESCRIPTION

Figure 1A:
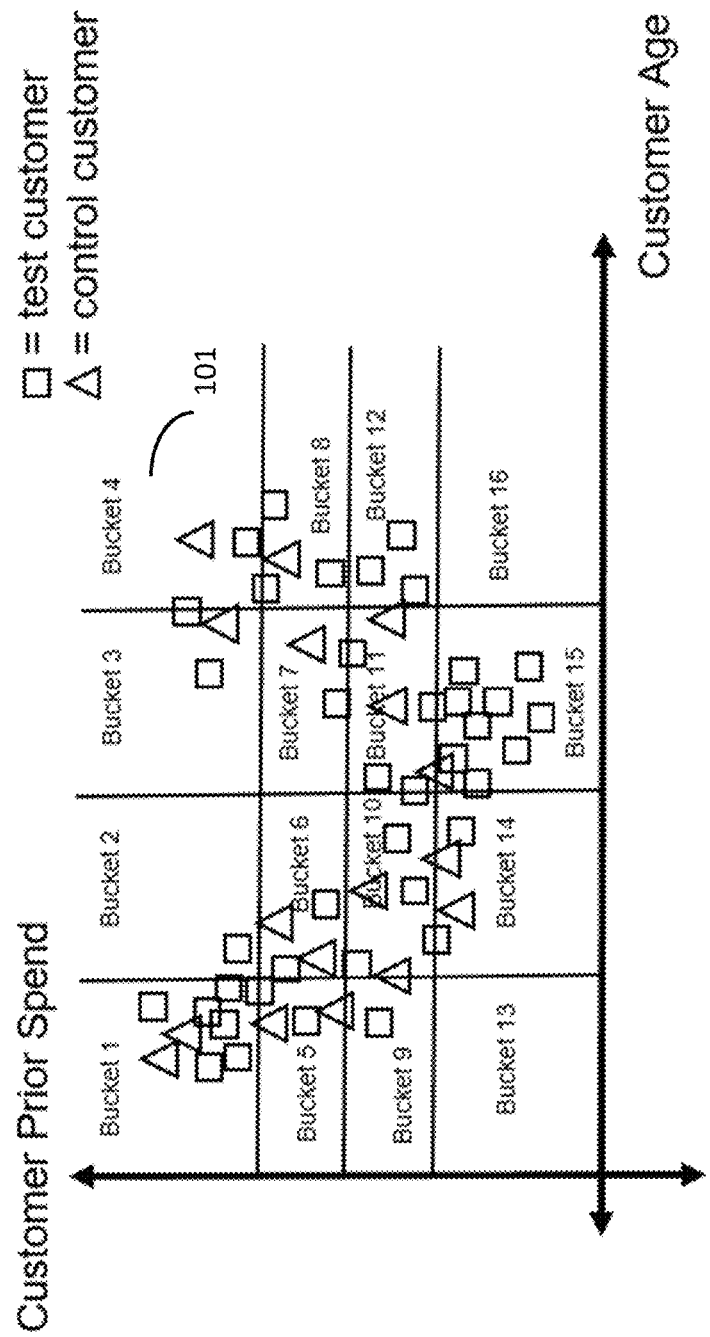
FIGS. 1A and 1B illustrate examples of a conventional bucketing method, according to an embodiment.
Figure 1B:
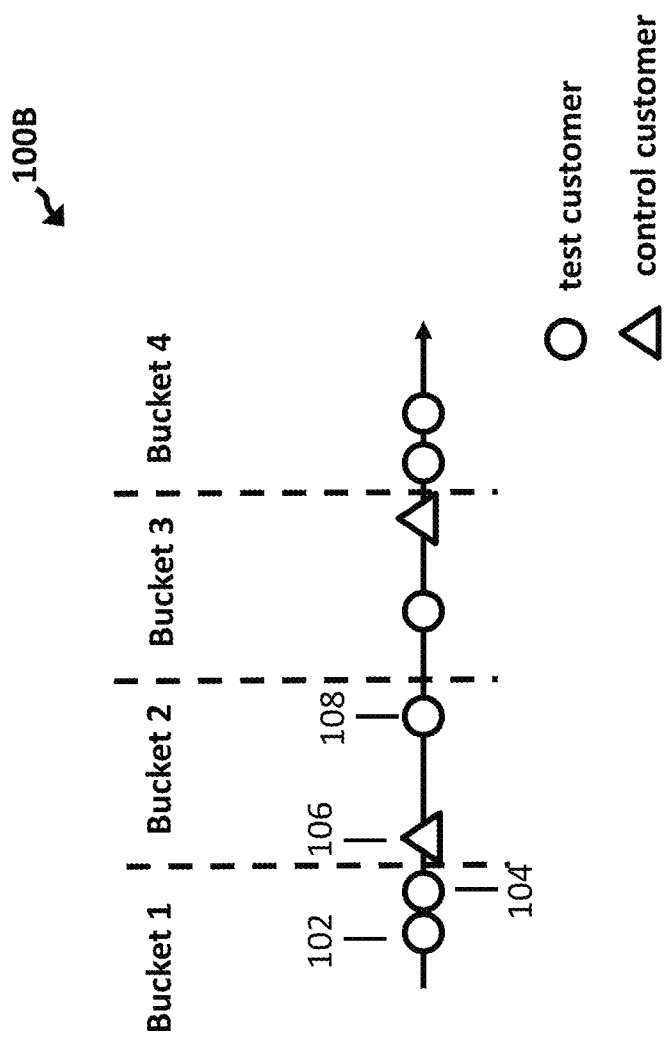

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

The embodiments described herein provide systems and methods for leveraging clustering technology to measure the effectiveness of an event with less or no bias. Specifically, the analytic server may measure the effectiveness of an event, such as a sales campaign, based on performance of the test group and performance of the control group. For example, the analytic server may send materials of the campaign to the group of test customers, while not send the promotional materials to the group of control customers. The analytic server may collect the transaction data of each group after the campaign for a certain period of time. The analytic server may compare the performances of the two groups based on the transaction data to determine the effectiveness of the campaign. Because the two groups of customers may contain bias, the analytic server may not directly compare the performances of the two groups. Instead, the analytic server may leverage the clustering technology to reduce the bias.

To reduce the bias included in the two groups, the analytic server may execute a clustering computer model to divide the whole population of the test group and the control group into a number of clusters. The analytic server may execute the clustering computer model based on a set of attributes prior to the event. Within each cluster, the customers are more similar in the set of attributes than the customers in other clusters. The analytic server may determine the performance difference between the test customers and control customers within each cluster. Because the test customers and control customers within each cluster are more similar in terms of the set of attributes, the performance difference within each cluster is less biased, and may reflect the impact of the event more accurately.

In addition to determining the performance difference within each cluster, the analytic server may calculate a weight factor for each cluster corresponding to a proportion of the test customer. Based on the performance difference within each cluster and the weight factor for each cluster, the analytic server may determine the effectiveness of the tested event.

Figure 1C:
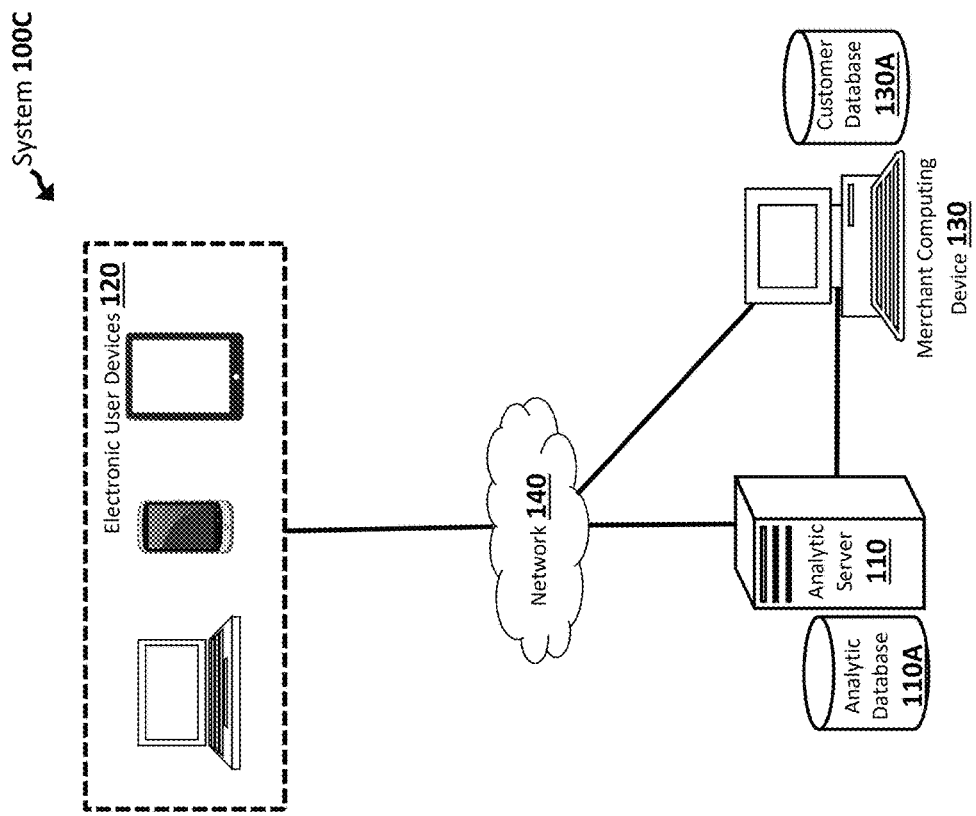
FIG. 1C illustrates a computer system for measuring effectiveness of an event leveraging clustering technology, according to an embodiment.

FIG. 1C illustrates components of a system 100C for measuring effectiveness of an event leveraging clustering technology, according to an embodiment. The system 100C may comprise an analytic server 110 with an analytic database 110A, a set of electronic user devices 120, and a merchant computing device 130 that are connected with each other via hardware and software components of one or more networks 140. The merchant computing device may comprise a customer database 130A. Examples of the network 140 include, but are not limited to, Local Area Network (LAN), Wireless Local Area Network (WLAN), Metropolitan Area Network (MAN), Wide Area Network (WAN), and the Internet. The communication over the network 140 may be performed in accordance with various communication protocols, such as Transmission Control Protocol and Internet Protocol (TCP/IP), User Datagram Protocol (UDP), and IEEE communication protocols.

The analytic server 110 may be any computing device comprising a processor and other computing hardware and software components. The analytic server 110 may be logically and physically organized within the same or different devices or structures and may be distributed across any number of physical structures and locations (e.g., cabinets, rooms, buildings, cities).

The analytic server 110 may be a computing device comprising a processing unit. The processing unit may include a processor with computer-readable medium, such as a random access memory coupled to the processor. The analytic server 110 may be running algorithms or computer executable program instructions, which may be executed by a single processor or multiple processors in a distributed configuration. The analytic server 110 may be configured to interact with one or more software modules of a same or a different type operating within the system 100C.

Non-limiting examples of the processor may include a microprocessor, an application specific integrated circuit, and a field programmable object array, among others. Non-limiting examples of the analytic server 110 may include a server computer, a workstation computer, a tablet device, and a mobile device (e.g., smartphone). Some embodiments may include multiple computing devices functioning as the analytic server 110. Some other embodiments may include a single computing device capable of performing the various tasks described herein.

The analytic server 110 may receive a request from the merchant computing device 130 to determine the effectiveness of an event, such as a campaign. The request may comprise a set of nodes representing a set of customers comprising a first subset of nodes (e.g., test group) and a second subset of nodes (e.g., control group). The first subset of nodes may be associated with the event, such as test customers that may receive the promotional materials of the campaign. The second subset of nodes may be not associated with the event, such as the control customers that may not receive the promotional materials of the campaign.

The merchant computing device 130 may be any computing device allowing a merchant to interact with the analytic server 110. The merchant computing device 130 may be any computing device comprising a processor and non-transitory machine-readable storage medium. The examples of the computing device may include, but are not limited to, a desktop computer, a laptop, a personal digital assistant (PDA), a smartphone, a tablet computer, and the like. The merchant computing device 130 may comprise any number of input and output devices supporting various types of data, such as text, image, audio, video, and the like. The merchant operating the merchant computing device 130 may try to launch a sales campaign. To determine the effectiveness of the campaign, the merchant computing device 130 may send the request to the analytic server 110 along with data associated with a set of customers. The merchant computing device 130 may comprise a customer database 130A storing the customer accounts, customer transactions, and other relevant data.

The customer database 130A may be any non-transitory machine-readable media configured to store existing customers' data, including customer account information and transaction information. Specifically, the customer account information may comprise customer identifier, address, contact information (e.g., email address, phone number), age, gender, and the like. The transaction information may comprise the customer's historical transactions, transaction date, transaction items, transaction amount, payment methods, and the like. The customer database 130A may include different attributes and the corresponding values for each customer. The merchant computing device 130 may send such customer data and transaction data associated with a set of customers to the analytic server 110.

Based on the received user data corresponding to the set of nodes (e.g., customers), the analytic server 110 may execute a clustering computer model on the set of user data to generate a number of clusters. The clustering computer model may group the set of customers into a number of clusters based on multiple dimensions. The multiple dimensions may be a set of attributes of the customers prior to the event. By executing the clustering computer model, the analytic server 110 may group the set of nodes (e.g., the set of customers/users) into a number of clusters. Each node, as used herein, may represent a user or an electronic device. The methods and systems described herein are not limited to clustering or identifying users. These methods and systems also apply to clustering any identifiable item (e.g., electronic device) in order to analyze an event. Nodes (e.g., users) in the same cluster are more similar (e.g., with similar values for the set of attributes) to each other than to those in other clusters.

The set of nodes may include the whole population of both test customers and control customers. After the analytic server 110 groups the whole population into a number of clusters, each cluster may include some test customers and some control customers. The analytic server 110 may calculate a weight factor for each cluster based on the number of test customers (nodes associated with the first subset of nodes) within each cluster. The weight factor of a cluster may be the proportion of the number of test customers in that particular cluster over the total number of test customers.

The analytic server 110 may execute a test and control model to determine the effectiveness of the event by comparing the performance value associated with the nodes within each cluster based on the weight factor for each cluster. During the campaign, the analytic server 110 (or the merchant computing device 130) may transmit promotional materials of the event (e.g., campaign) to the set of electronic user devices 120 associated with the test group, while not transmit the promotional materials to the set of electronic user devices 120 associated with the control group. For example, the analytic server 110 may send the promotional materials via emails or test messages or phone calls, or any other electronic messages.

The set of electronic user devices 120 may be any computing device allowing a customer to interact with the analytic server 110 and the merchant computing devices 130. The electronic user devices 120 may be any computing device comprising a processor and non-transitory machine-readable storage medium. The examples of the computing device may include, but are not limited to, a desktop computer, a laptop, a personal digital assistant (PDA), a smartphone, a tablet computer, and the like. The electronic user devices 120 may comprise any number of input and output devices supporting various types of data, such as text, image, audio, video, and the like. The electronic user devices 120 associated with the test customers may receive the promotional materials. A customer/user operating the electronic user device 120 may purchase products provided by the merchant.

The analytic server 110 may continuously collect the performance data/value of both groups for a certain period of time. The performance data may be the monetary value associated with each customer within the test group and the control group. For example, the analytic server 110 may collect the transaction data of the customers in both groups after the campaign and save the transaction data into the analytic database 110A. The analytic server 110 may execute a test and control model to determine the effectiveness of the event by comparing the performance between the two groups.

The analytic server 110 may compare the monetary values of test customers and control customers within each cluster to determine an impact value for each cluster. The impact value of a particular cluster may be the performance difference between the average spend of the set of test customers and the average spend of the set of control customers in that particular cluster. Because the customers within the same cluster may have similar attributes prior to the events, including similar spending habits prior to the event, the performance difference may originate from the event.

After determining the impact value for each of the clusters, the analytic server 110 may determine the effectiveness of the event by combining the impact values across all of the clusters based on the weight factor of each cluster. The analytic server 110 may determine the effectiveness of the event based on the weighted sum of the impact values across all of the clusters. If the weighted sum indicates that the test customers receiving the promotional materials have a higher average spend, the analytic server may determine that the event (e.g., the campaign) is effective. The effectiveness of the event may be the increase of the average spend resulted from the promotional materials. The analytic server 110 may use different statistic methods to calculate performance of the two groups and save the group performance values into the analytic database 110A.

The analytic database 110A may be any non-transitory machine-readable media configured to store the received set of nodes (e.g., the set of customer data), the clusters of the set of nodes, the weight factor of each cluster, the impact value of each cluster, the transaction data of both test group and the control group, the performance difference between the two groups, and any other relevant information. The analytic database 110A may be a part of the analytic server 110. The analytic database 110A may be a separate component in communication with the analytic server 110.

In some embodiments, the merchant computing device 130 may send the promotional materials to the set of electronic user devices 120 associated with the test customers. The merchant computing device 130 may collect the monetary values of the customers, such as the transaction data of the customers. The analytic server 110 may communicate with the merchant computing device 130 to receive the transaction data of both groups to compare the group performance.

Figure 2:
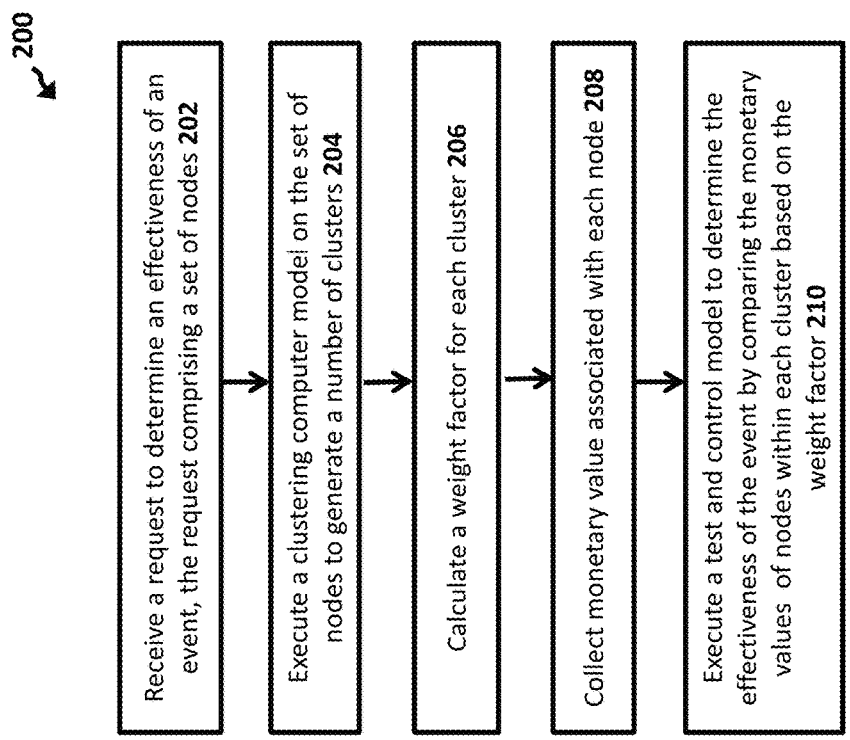
FIG. 2 illustrates a flowchart depicting operational steps for measuring effectiveness of an event leveraging clustering technology, according to an embodiment.

FIG. 2 illustrates execution of a method 200 for measuring effectiveness of an event leveraging clustering technology, according to an embodiment. Other embodiments may comprise additional or alternative steps or may omit some steps altogether.

At step 202, the analytic server may receive a request to determine an effectiveness of an event. For example, the analytic server may receive a request to determine the effectiveness of a campaign, the request may comprise a set of nodes. Alternatively, the analytic server may retrieve a set of nodes comprising a first subset of nodes and a second subset of nodes where each node represents a customer, a user, or a user device. The first subset of nodes may be associated with the event, such as test customers. The second subset of nodes may be not associated with the event, such as the control customers. For example, the first subset may be the test dataset (e.g., test group) that may receive the promotional materials of the campaign. The second subset may be the control dataset (e.g., control group) that may not receive the promotional materials of the campaign. The analytic server may receive the request from a computing device associated with a merchant.

At step 204, the analytic server may execute a clustering computer model using the set of nodes to generate a number of clusters. Each cluster may comprise at least one node within the set of nodes. To generate a number of clusters for the set of nodes, the analytic server may calculate a multi-dimensional distance value between each node within the set of nodes. Each dimension may correspond to an attribute of each node within the set of nodes prior to the event. The analytic server may assign a cluster to each node based on its respective distance to other nodes, and iteratively repeat calculating the distance value and assigning each node to a cluster until the distance values of nodes within each cluster satisfy a distance threshold.

For example, the analytic server may execute a clustering computer model using the set of user data to generate a number of clusters based on multiple dimensions. The multiple dimensions may represent a set of attributes. The set of attributes may include prior spend in a certain period, days since last transaction, number of transactions in a certain period, demographic data (e.g., age, sex, income level, education level), and any other relevant attributes prior to the event. The analytic server may generate a number of clusters with each cluster including one or more users with similar values for the set of attributes. By executing the clustering computer model, the analytic server may group the set of nodes (e.g., the set of customers/users)

into a number of clusters. Nodes (e.g., users) in the same cluster are more similar (in the sense of the set of attributes) to each other than to those in other clusters. For example, assuming the analytic server executes the clustering computer model based on three attributes including age, gender, and income level. The customers in each cluster may be within the same age range, with the same gender, and within the same income bracket.

In some embodiments, the analytic server may divide the set of nodes into a predetermined number of clusters (e.g., five or ten clusters). For example, the analytic server may receive a parameter for the number of clusters from an administrative user. The analytic server may iteratively execute the clustering computer model and only stop until the analytic server has reached the predetermined number of clusters. In some other embodiments, the analytic server may iteratively execute the clustering computer model and only stop until the distance values of nodes within each cluster satisfying a distance threshold. Alternatively, the analytic server may iteratively execute the clustering computer model until the distance values decreasing is less than a threshold or the distance values stop decreasing.

The distance between two nodes (users) may represent a difference of two nodes (users) with respect to one or more attributes. For example, a "spend-30 distance" between two nodes represents how similar the two nodes are with respect to spending money within the last 30 days. As described herein, the analytic server may utilize this distance to identify similar users and cluster nodes accordingly. Furthermore, because the analytic server considers more than one attribute when assigning nodes to different clusters, the analytic server may generate the distance representing more than one attribute. The analytic server may utilize any distance calculating technique, such as the Euclidean distance or any other distance calculation method, to generate the multidimensional distance value for each node. The Euclidean distance, as described and used herein, may be a "straight-line" distance between two nodes.

In some embodiments, the analytic server may use a non-hierarchical clustering method, such as K-means clustering algorithm, to generate a predetermined number of clusters. For example, the analytic server may generate 10 clusters. The analytic server may start with an initial set of cluster centers. The initial set of cluster centers may be 10 nodes randomly chosen from the set of nodes. The analytic server may calculate the Euclidean distance between each node to each of the centers. The analytic server may minimize the within-cluster scatter, which is the average distance for every node to its cluster center. In Euclidean space, the within-cluster scatter is the sum of squared distances of each node to the cluster centers. Specifically, the analytic server may minimize the within-cluster scatter with the following two-step iterative process. In the first step, the analytic server may assign each node to its closest cluster center. In the second step, the analytic server may calculate the average location of all the nodes assigned to each cluster and move the cluster center to the average location (e.g., readjust the data point). By repeating this process, the analytic server may iteratively reassign the nodes to more appropriate clusters until either the algorithm converges (the assignment of each node stops changing) or the within-cluster scatter reaches a minimum distance value (e.g., stops decreasing).

The clustering algorithm implemented in the clustering computer model may be K-means clustering, mean-shift clustering, density-based spatial clustering of applications with noise, expectation-maximization clustering, hierarchical clustering, and any other clustering algorithms.

At step 206, the analytic server may calculate a weight factor for each cluster. The weight factor for each cluster may correspond to a number of nodes associated with the first subset of nodes (e.g., test group) within each cluster. More specifically, the weight factor may correspond to a proportion of a number of nodes associated with the first subset of nodes within each cluster.

As discussed above, the set of nodes may include the whole population of both test customers and control customers. After the analytic server groups the whole population into a number of clusters, each cluster may include some test customers and some control customers. The weight factor of a cluster may correspond to how many test customers have been assigned to that particular cluster. The weight factor of a cluster may be the proportion of the number of test customers (nodes associated with the first subset of nodes) in that particular cluster over the total number of test customers (the first subset of nodes). For example, assuming the total number of first subset of nodes (e.g., test customers) is 100, there are 5 test customers within a particular cluster. The analytic server may assign a weight factor of 5% (e.g., 5/100) to that particular cluster.

At step 208, the analytic server may collect the monetary value associated with each node within the first subset of nodes and the second subset of nodes. During the campaign, the analytic server (or the merchant server) may transmit promotional materials of the event (e.g., campaign) to the test group via electronic messages, while not transmit the promotional materials to the control group. The analytic server may continuously collect the performance data/value of both groups for a certain period of time. The performance data may be the monetary value associated with each customer within the test group and the control group. For example, the analytic server may collect the transaction data of the customers, such as the transaction date, transaction amount, transaction items, and the like. The performance data may be other metrics associated with each customer. For example, the performance data may be death rates for patients within the test group and the control group.

The transactions may contain data indicating whether the transactions were part of a test group of the marketing campaign. The analytic server may collect such transaction data and store the transaction data into a database. The database may include a group indicator data field indicating whether a transaction is associated/linked with the event (e.g., campaign). For instances, a group of the transaction records may include a data field, or may be tagged with certain metadata, indicating that the transactions represented by the records were part of a test group (associated/linked with the event) or a control group (not associated/linked with the event).

In some embodiments, the merchant computing device may collect the transaction data (e.g., monetary value) of the customers within both groups. The analytic server may communicate with the merchant computing device to receive the transaction data.

At step 210, the analytic server may execute a test and control model to determine the effectiveness of the event by comparing the monetary value associated with the nodes within each cluster based on the weight factor for each cluster. Alternatively, the analytic server may instruct another server to execute the test and control model. As described above, the analytic server may collect the transaction data after campaign for a certain period of time (e.g., a time threshold), the analytic server may execute the test and control model upon the satisfaction of the time threshold. The test and control model may comprise statistical methods to calculate the performance difference between the test group and the control group based on the transaction data. The analytic server may determine the effectiveness of the event based on the performance difference.

The analytic server may retrieve the transaction data of both test group and control group from the database based on the data field of the group indicator. For instance, the analytic server may retrieve the test group transaction data by selecting the transaction records with the group indicator data as test group. Similarly, the analytic server may select the control group transaction data by selecting the transaction records with the group indicator data as control group.

After retrieving the transaction data of each customer, the analytic server may compare the monetary values (e.g., transaction amounts) of test customers with the monetary values (e.g., transaction amounts) of control customers within each cluster. For example, when comparing test customers to control customers, the analytic server may compare test customers within cluster A to control users within cluster A; and compare test customers of cluster B with control customers within cluster B. Within a particular cluster including a set of test customers and a set of control customers, the analytic server may determine the average spend of the set of test customers and the average spend of the control customers in that particular cluster. The analytic server may determine an impact value for the cluster by calculating the difference between the average spend of the set of test customers and the average spend of the set of control customers in that particular cluster. The analytic server may determine the impact value for each of the clusters.

The impact value may correspond to a difference between an average monetary value of the nodes associated with the first subset of nodes (e.g., test customers) and an average monetary value of the nodes associated with the second subset of nodes (e.g., control customers) within the cluster. Thus, the impact value for each cluster may be the performance difference between the test customers and the control customers within each cluster. Because the customers within the same cluster may have similar attributes prior to the events, including similar spending habits prior to the event, the performance difference may originate from the event. For example, if the average spend of test customers is higher than the average spend of control customers within the same cluster, the analytic server may determine that the difference originates from the campaign.

In some embodiments, the analytic server may compare the monetary values of test customers and control customers using various analytic methods. For example, the analytic server may calculate the median value of the monetary values for the two set of customers within each cluster. The analytic server may determine the impact value for each cluster by calculating the difference between the median values of the two set of customers within the cluster. The analytic server may determine the impact value for each cluster using any other characteristics of the two sets of customers, besides the average spend and the median value.

After determining the impact value for each of the clusters, the analytic server may determine the effectiveness of the event by combining the impact values across all of the clusters based on the weight factor of each cluster. Specifically, the analytic server may calculate the weighted sum of the impact values across all of the clusters. For example, the weighted sum=$\Sigma_{i=1}^{n} w_i x_i$, where $w_i$ is the weight factor of cluster i; $x_i$ is the impact value of cluster i; n is the number of clusters. By considering the weight factor of each cluster, the analytic server may emphasize some cluster's impact values. For instance, assuming there are 100 test customers in total, if cluster A has 20 test customers and cluster B has 5 test customers, the analytic server may assign a higher weight factor 20% to cluster A and a lower weight factor 5% to cluster B. Because cluster A has a higher weight factor than cluster B, the performance difference between the test customers and control customers (e.g., impact value) in cluster A is emphasized.

The analytic server may determine the effectiveness of the event based on the weighted sum of the impact values across all of the clusters. If the weighted sum indicates that the test customers receiving the promotional materials have a higher average spend, the analytic server may determine that the event (e.g., the campaign) is effective. The effectiveness of the event may be the increase of the average spend resulted from the promotional materials.

Because the test customers and control customers within each cluster are more similar in terms of the set of attributes prior to the event, the performance difference (e.g., impact value) within each cluster may reflect the impact of the tested event more accurately with less or no bias. Because the analytic server determines the effectiveness of event by combining the performance difference of each cluster, the measurement of the effectiveness of event is more accurate with less or no bias.

In some configurations, multiple servers may perform the steps of the method 200. The analytic server may distribute one or more steps of the method 200 among multiple servers to increase efficiency. For instance, while the analytic server may retrieve the set of nodes, the analytic server may instruct a second server to cluster the nodes. Furthermore, the analytic server may instruct a third server to execute the test and control model to determine the effectiveness of an event.

Figure 3:
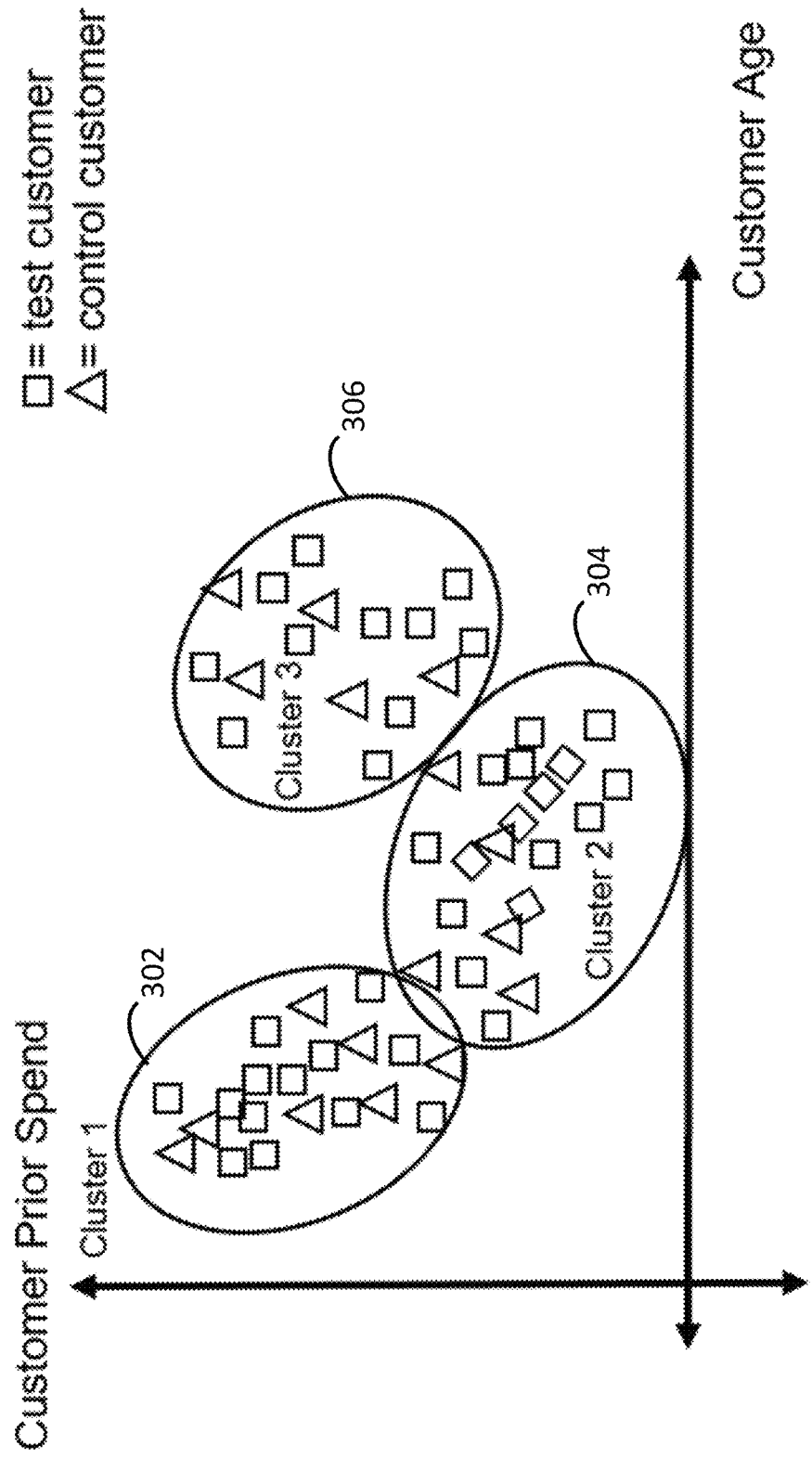
FIG. 3 illustrates an example of clustering a set of customers, according to an embodiment.

FIG. 3 illustrates an example 300 of clustering a set of customers, according to an embodiment. In this example, the clustering method may divide the whole population of test group and control group into three clusters 302, 304, 306 based on two attributes: customer prior spend and customer age. The test customers and control customers falling within the same cluster are semantically similar to each other. Comparing to the conventional bucketing method in FIG. 1A, the clustering method described herein may capture the semantics of the customer data and generate clusters that accurately group customers with similar attributes. For example, each cluster may include a number of customers whose attributes are more similar to each other than to customers in other clusters. Furthermore, while each bucket in FIG. 1A includes too few customers, each cluster in FIG. 3 may include a relatively larger number of customers than conventional bucketing methods. As a result, the clustering method may be less sensitive to noise in the data.

Figure 4:
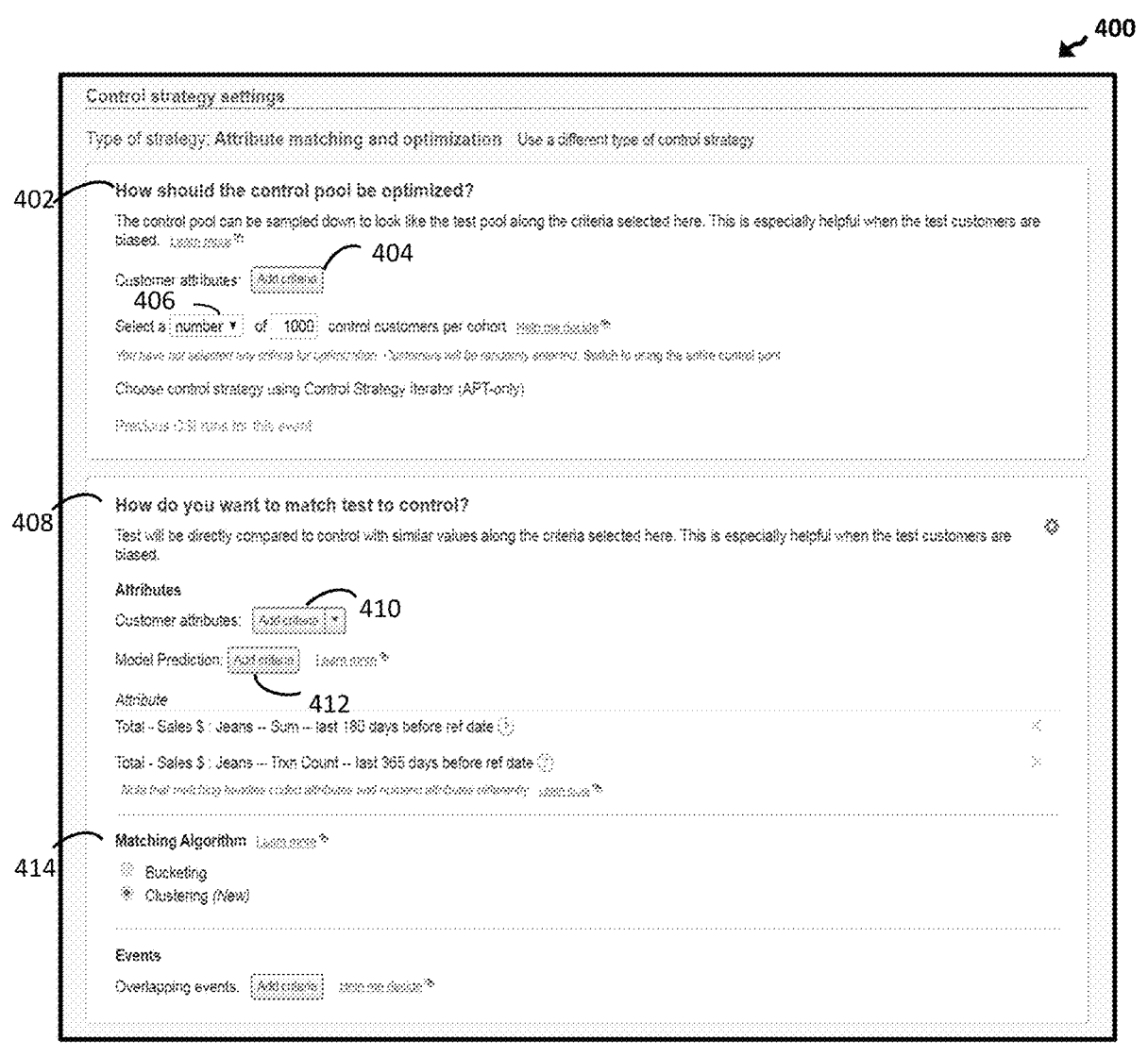

FIG. 4 illustrates a graphical user interface (GUI) 400 provided by the analytics server when executing the clustering computer model, according to an embodiment. The GUI 400 may comprise a component 402 for setting and optimizing the control group (e.g., control pool). The GUI 400 may comprise a button 404 that allows an administrative user to set criteria of customer attributes for the control group. The GUI 400 may also comprise an interactive component 406 (e.g., a dropdown menu) for the user to select the number of control customers.

In addition, the GUI 400 may comprise a component 408 for setting matching criteria, according to an embodiment. For example, the analytic server may match the test group and the control group based on the criteria selected in this component. The GUI 400 may comprise a button 410 for setting matching criteria of customer attributes, and another button 412 for setting matching criteria of model prediction.

Furthermore, the GUI 400 may comprise a component 414 for selecting matching algorithm. The component 414 may include a radio button or option button that allows the user to choose either the conventional bucketing method or the clustering method described herein.

Figure 5:
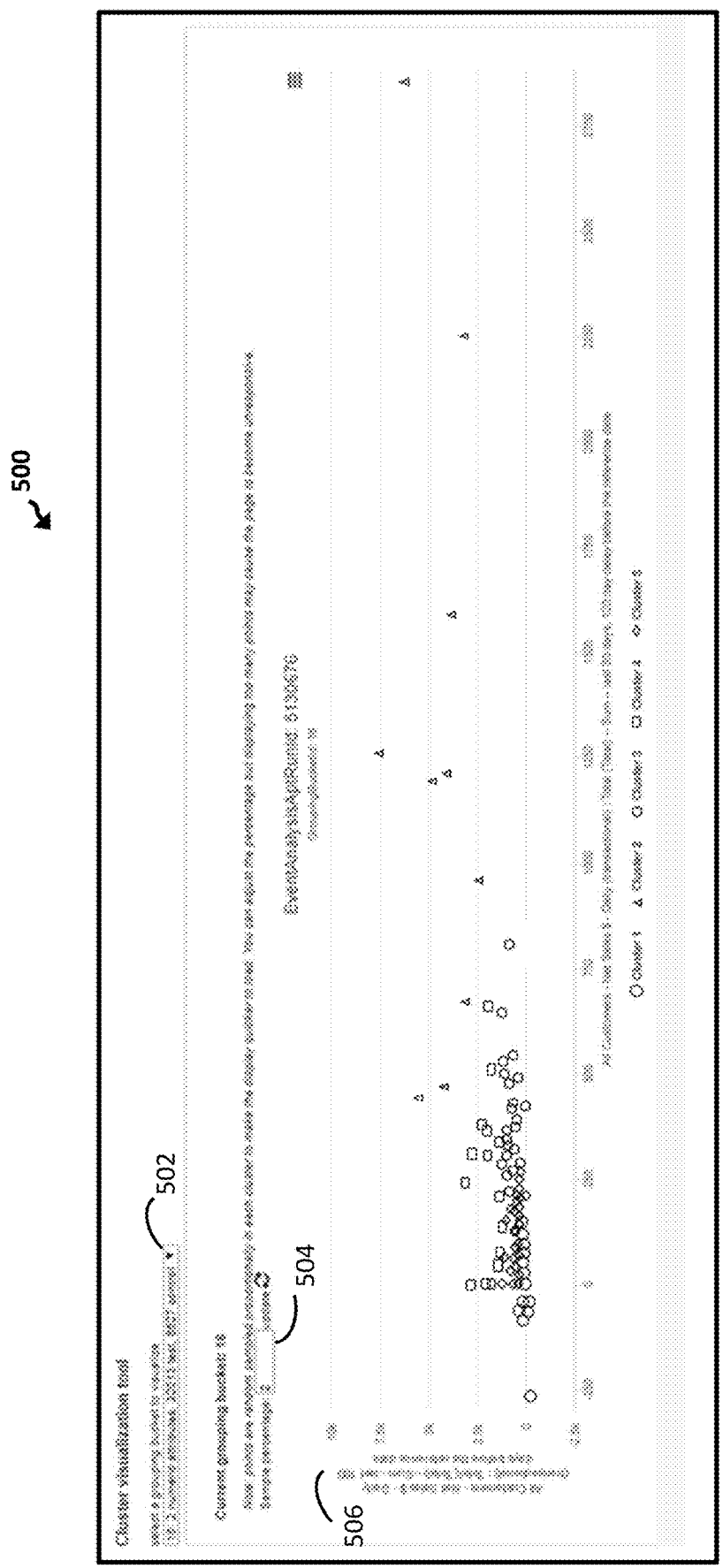
FIG. 5 illustrates a graphical user interface of a cluster visualization tool, according to an embodiment.

FIG. 5 illustrates a graphical user interface 500 of a cluster visualization tool, according to an embodiment. The GUI 500 may comprise a graphical interactive component 502 that allows the user to select a set of nodes to be clustered in the cluster visualization tool. In this example, the user may select a set of nodes including 32013 test customers and 6527 control customers. Because the number of nodes may be large, the GUI 500 may display a percentage of the whole set of nodes for illustrative purposes. The GUI 500 comprise an interactive component 504 to set the percentage. After clustering the set of selected nodes, the GUI 500 may visually show how the customers are assigned to different clusters in the cluster visualization tool 506. In this example, the cluster visualization tool 506 may display the customers in five clusters. Customers within each cluster are located close to each other in a matrix. The cluster visualization tool 506 may display customers of different clusters in different indicators.

Figure 6:
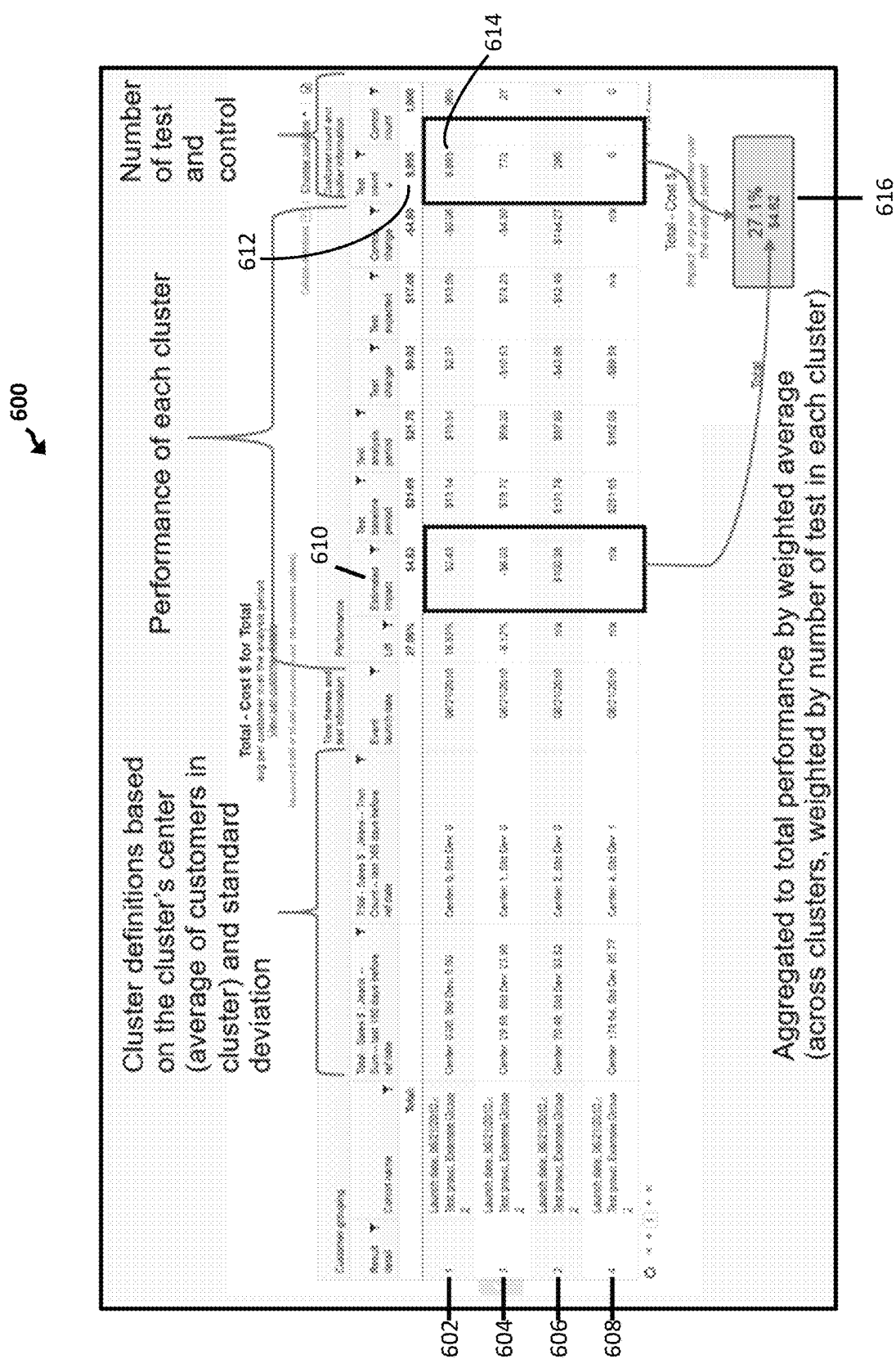
FIG. 6 illustrates an example of determining the effectiveness of an event leveraging clustering technology, according to an embodiment.

FIG. 6 illustrates an example 600 of determining the effectiveness of an event leveraging clustering technology, according to an embodiment. In this example, the analytic server may generate four clusters 602, 604, 606, 608 based on the customer data. Each row in the figure is a cluster. The analytic server may calculate cluster level results for each cluster. For example, the analytic server may calculate the estimated impact value 610 for each cluster. The estimated impact value 610 for each cluster may be the performance difference between the test customers and the control customers within each cluster. As discussed above, the analytic server may determine the effectiveness of the event by combining the impact values across all of the clusters based on the weight factor of each cluster.

The weight factor for each cluster may be the proportion of the test users in the particular cluster over the total number of test customers. As shown in the figure, there are 9955 612 test customers in total. Cluster 602 includes 8893 614 test customers, thus the weight factor for cluster 602 may be 0.8933 (e.g., 8893/9955). Similarly, the weight factor for cluster 604 may be 0.07755 (e.g., 772/9955). The weight factor for cluster 606 may be 0.0291 (e.g., 290/9955). The weight factor is not applicable for cluster 608, because there are zero test customers in cluster 608.

The analytic server may combine/aggregate the estimated impact values 610 across all of the clusters by calculating the weighted sum of the estimated impact values 610. The weighted sum may be the sum of product of the estimated impact value 610 of each cluster times the weight factor for each cluster. In this example, the weighted sum may be 0.8933*2.43−0.07755*6.03+0.0291*100.38, which is equal to 4.62 616.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method comprising:
receiving, by a server from an electronic device via a first communication protocol, a request to determine an effectiveness of an event;
retrieving, by the server, a set of nodes comprising a first subset of nodes where each node within the first subset of nodes is associated with the event and a second subset of nodes where each node within the second subset of nodes is not associated with the event;
executing, by the server, a clustering computer model comprising a K-Means clustering algorithm to generate a number of clusters for the set of nodes where each cluster comprises at least one node within the set of nodes by:
calculating a multidimensional distance value between each node within the set of nodes, each dimension within the multidimensional distance corresponding to an attribute of each node within the set of nodes prior to the event, and
iteratively calculating the multidimensional distance value and assigning each node to a cluster until multidimensional distance values of nodes within each cluster satisfy a distance threshold, wherein each cluster comprises at least one node from the first subset of nodes and at least one node from the second subset of nodes;
based on whether the nodes of the set of nodes are associated with the first subset of nodes or the second subset of nodes, transmitting, by the server via a second communication protocol, an electronic message for the event to a computing device of each of the first subset of nodes but not a computing device for any of the second subset of nodes;
calculating, by the server, a weight factor for each cluster, the weight factor for each cluster corresponding to a proportion of a number of nodes associated with the first subset of nodes within the cluster over a total number of the first subset of nodes; and
responsive to calculating the weight factor for each cluster, generating, by the server, an instruction to execute a test and control model to determine the effectiveness of the event by:
for each cluster, calculating, by the server, a difference between an average spend by nodes associated with the first subset of nodes within the cluster and an average spend by nodes associated with the second subset of nodes within the cluster; and
calculating, by the server, a sum of the calculated differences of each cluster based on the weight factor for each cluster.

2. The method of claim 1, further comprising:
calculating, by the server, an impact value for each cluster corresponding to a difference between an average performance value of nodes associated with the first subset of nodes and an average performance value of nodes associated with the second subset of nodes within the cluster.

3. The method of claim 2, further comprising:
determining, by the server, the effectiveness of the event by combining the impact values across the number of clusters based on the weight factor for each cluster.

4. The method of claim 3, further comprising:
calculating, by the server, a weighted sum of the impact values across the number of clusters based on the weight factor for each cluster.

5. The method of claim 1, further comprising:
iteratively calculating, by the server, the multidimensional distance value and assigning each node to a cluster until the multidimensional distance stops decreasing.

6. The method of claim 1, wherein calculating the multidimensional distance value between each node within the set of nodes comprises calculating multidimensional distance values corresponding to at least 20 attributes of each node.

7. The method of claim 1, wherein the server executes the test and control model upon satisfaction of a time threshold.

8. The method of claim 1, further comprising:
iteratively calculating, by the server, the multidimensional distance value and assigning each node to a cluster until the assignment of each node stops changing.

9. A computer system comprising:
an electronic device,
a server in communication with the electronic device and configured to:

receive, from the electronic device via a first communication protocol, a request to determine an effectiveness of an event;

retrieve a set of nodes comprising a first subset of nodes where each node within the first subset of nodes is associated with the event and a second subset of nodes where each node within the second subset of nodes is not associated with the event;

execute a clustering computer model comprising a K-Means clustering algorithm to generate a number of clusters for the set of nodes where each cluster comprises at least one node within the set of nodes by:

calculating a multidimensional distance value between each node within the set of nodes, each dimension within the multidimensional distance corresponding to an attribute of each node within the set of nodes prior to the event, and iteratively calculating the multidimensional distance value and assigning each node to a cluster until multidimensional distance values of nodes within each cluster satisfy a distance threshold, wherein each cluster comprises at least one node from the first subset of nodes and at least one node from the second subset of nodes;

based on whether the nodes of the set of nodes are associated with the first subset of nodes or the second subset of nodes, transmit, via a second communication protocol, an electronic message for the event to a computing device of each of the first subset of nodes but not a computing device for any of the second subset of nodes;

calculate a weight factor for each cluster, the weight factor for each cluster corresponding to a proportion of a number of nodes associated with the first subset of nodes within the cluster over a total number of the first subset of nodes; and responsive to calculating the weight factor for each cluster, generate an instruction to execute a test and control model to determine the effectiveness of the event by:

for each cluster, calculating a difference between an average spend by nodes associated with the first subset of nodes within the cluster and an average spend by nodes associated with the second subset of nodes within the cluster; and calculating a sum of the calculated differences of each cluster based on the weight factor for each cluster.

10. The computer system of claim 9, wherein the server is further configured to:

calculate an impact value for each cluster corresponding to a difference between an average performance value of nodes associated with the first subset of nodes and an average performance value of nodes associated with the second subset of nodes within the cluster.

11. The computer system of claim 10, wherein the server is further configured to:

determine the effectiveness of the event by combining the impact values across the number of clusters based on the weight factor for each cluster.

12. The computer system of claim 11, wherein the server is further configured to:

calculate a weighted sum of the impact values across the number of clusters based on the weight factor for each cluster.

13. The computer system of claim 9, wherein the server is further configured to:

iteratively calculate the multidimensional distance value and assign each node to a cluster until the multidimensional distance stops decreasing.

14. The computer system of claim 9, wherein the server executes the test and control model upon satisfaction of a time threshold.

15. The computer system of claim 9, wherein the server is further configured to:

iteratively calculate the multidimensional distance value and assign each node to a cluster until the assignment of each node stops changing.

* * * * *